US010169619B2

(12) United States Patent
Goldberg et al.

(10) Patent No.: US 10,169,619 B2
(45) Date of Patent: Jan. 1, 2019

(54) PHYSICAL TOKEN BASED SECURED CHARGE MANAGEMENT OF A USER EQUIPMENT

(71) Applicant: INTERNATIONAL BUSINESS MACHINES CORPORATION, Armonk, NY (US)

(72) Inventors: Itzhack Goldberg, Hadera (IL); Harry R. McGregor, Tucson, AZ (US); Yossi Mesika, Afula (IL); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/338,873

(22) Filed: Oct. 31, 2016

(65) Prior Publication Data

US 2018/0121683 A1 May 3, 2018

(51) Int. Cl.
| G06F 21/81 | (2013.01) |
| G06F 21/44 | (2013.01) |
| G06F 21/88 | (2013.01) |
| G06F 21/34 | (2013.01) |
| G06F 21/45 | (2013.01) |
| G06F 21/31 | (2013.01) |
| H04L 9/32 | (2006.01) |
| H04L 9/08 | (2006.01) |
| H04L 29/06 | (2006.01) |
| H02J 7/00 | (2006.01) |

(52) U.S. Cl.
CPC .............. *G06F 21/81* (2013.01); *G06F 21/31* (2013.01); *G06F 21/34* (2013.01); *G06F 21/44* (2013.01); *G06F 21/445* (2013.01); *G06F 21/45* (2013.01); *G06F 21/88* (2013.01); *H04L 9/0897* (2013.01); *H04L 9/3226* (2013.01); *H04L 63/0853* (2013.01); *H02J 2007/0001* (2013.01)

(58) Field of Classification Search
CPC ........ G06F 21/34; G06F 21/44; G06F 21/445; G06F 21/45; G06F 21/81; G06F 21/88; G06F 21/31; H02J 2007/0001; H04L 9/0897; H04L 63/0853; H04L 9/3226
See application file for complete search history.

(56) References Cited

U.S. PATENT DOCUMENTS

| 4,953,202 A | * | 8/1990 | Newell ................ H04M 1/673 |
| | | | 379/188 |
| 9,092,623 B2 | | 7/2015 | Britton et al. |
| (Continued) |

OTHER PUBLICATIONS

Shilov, Anton. "USB-C Authentication Tech to Restrict Usage of Uncertified USB-C Accessories and Cables". Anandtech. Apr. 13, 2016. http://www.anandtech.com/show/10251/usbc-authentication-announced.*

(Continued)

*Primary Examiner* — Theodore C Parsons
(74) *Attorney, Agent, or Firm* — Griffiths & Seaton PLLC

(57) ABSTRACT

Embodiments for physical token based secured charge management of a user equipment (UE) by a processor. A power charging session is authorized by firmware of the UE for charging the UE upon detecting one or more physical authentication tokens within a selected area of a power charging source or on the power charging source itself, or combination thereof.

17 Claims, 6 Drawing Sheets

(56) References Cited

U.S. PATENT DOCUMENTS

| | | | |
|---|---|---|---|
| 9,385,786 B2 | 7/2016 | Clement et al. | |
| 2003/0158609 A1 | 8/2003 | Chiu | |
| 2005/0162687 A1* | 7/2005 | Lee | H04N 1/00132 |
| | | | 358/1.15 |
| 2006/0121884 A1* | 6/2006 | Chana | H04L 63/10 |
| | | | 455/411 |
| 2006/0272031 A1* | 11/2006 | Ache | G06F 21/10 |
| | | | 726/28 |
| 2007/0217344 A1* | 9/2007 | Krywaniuk | H04L 12/24 |
| | | | 370/254 |
| 2008/0218126 A1 | 9/2008 | Bansal et al. | |
| 2010/0026248 A1 | 2/2010 | Barrade et al. | |
| 2010/0280678 A1 | 11/2010 | Tate, Jr. et al. | |
| 2011/0018679 A1 | 1/2011 | Davis et al. | |
| 2011/0156640 A1* | 6/2011 | Moshfeghi | H02J 50/20 |
| | | | 320/108 |
| 2012/0185187 A1* | 7/2012 | Parakulam | H04Q 9/00 |
| | | | 702/63 |
| 2012/0331301 A1 | 12/2012 | Outwater et al. | |
| 2013/0088199 A1* | 4/2013 | Matsuno | B60L 11/1838 |
| | | | 320/109 |
| 2013/0122804 A1 | 5/2013 | Narendra | |
| 2013/0162430 A1 | 6/2013 | Scherzer et al. | |
| 2013/0187617 A1 | 7/2013 | Tham | |
| 2014/0082384 A1 | 3/2014 | De Cesare et al. | |
| 2014/0239883 A1 | 8/2014 | Hobson et al. | |
| 2014/0347018 A1* | 11/2014 | Boblett | B60L 11/1838 |
| | | | 320/162 |
| 2015/0089248 A1* | 3/2015 | Obie | G06F 1/266 |
| | | | 713/300 |
| 2015/0130630 A1* | 5/2015 | Outwater | G01D 4/006 |
| | | | 340/870.02 |
| 2015/0205990 A1 | 7/2015 | Younger et al. | |
| 2015/0333545 A1 | 11/2015 | Luce | |
| 2015/0358333 A1 | 12/2015 | Cronin | |
| 2016/0056966 A1* | 2/2016 | Bell | H04L 12/10 |
| | | | 713/310 |
| 2016/0103990 A1* | 4/2016 | Han | G06F 21/82 |
| | | | 726/19 |
| 2016/0174020 A1 | 6/2016 | Huttunen et al. | |
| 2016/0181857 A1 | 6/2016 | Konanur et al. | |
| 2016/0264011 A1* | 9/2016 | Yasukawa | G06Q 30/06 |
| 2016/0359349 A1* | 12/2016 | Todd | H02J 7/0044 |

OTHER PUBLICATIONS

List of IBM Patents or Patent Applications Treated as Related dated Nov. 3, 2016 (2 pages).

Anonymous, "A Method and System for Alerting a User about Mobile Signal Strength Degradation," An IP.com Prior Art Database Technical Disclosure, IP.com No. IPCOM000232217D, Oct. 27, 2013 (3 pages).

Anonymous, "Smart mobile power management incorporated with location based service," An IP.com Prior Art Database Technical Disclosure, IP.com No. IPCOM000239318D, Oct. 29, 2014 (8 pages).

Probstl et al., "Smart: Smart charging for smart phones," 2015 IEEE 21st International Conference on Embedded and Real-Time Computing Systems and Applications, 2015 (10 pages).

* cited by examiner

PHYSICAL TOKEN BASED SECURED CHARGE MANAGEMENT OF A USER EQUIPMENT

CROSS-REFERENCE TO RELATED APPLICATIONS

This Application is related to the following two applications having U.S. application Ser. No. 15/338,876 and 15/338,881, each filed on even date as the present application.

BACKGROUND OF THE INVENTION

Field of the Invention

The present invention relates in general to computing systems, and more particularly to, various embodiments for physical token based secured charge management of a user equipment (UE) by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Some electronic devices are specifically designed for portability and on-the-go use, including, for example, a mobile phone (such as a smart phone), a laptop, a portable music player or an MP3 player, a tablet, a portable gaming unit, a camera, and the like. The portability of these electronic devices are subject to increasing risks of being lost, stolen, or misplaced. However, each of these devices requires frequent recharging.

SUMMARY OF THE INVENTION

Various embodiments for physical token based secured charge management of a user equipment (UE) by a processor, are provided. In one embodiment, by way of example only, a method for using physical token based secured charge management of a user equipment (UE), again by a processor, is provided. A power charging session is authorized by firmware of the UE for charging the UE upon detecting one or more physical authentication tokens within a selected area of a power charging source or on the power charging source itself, or combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
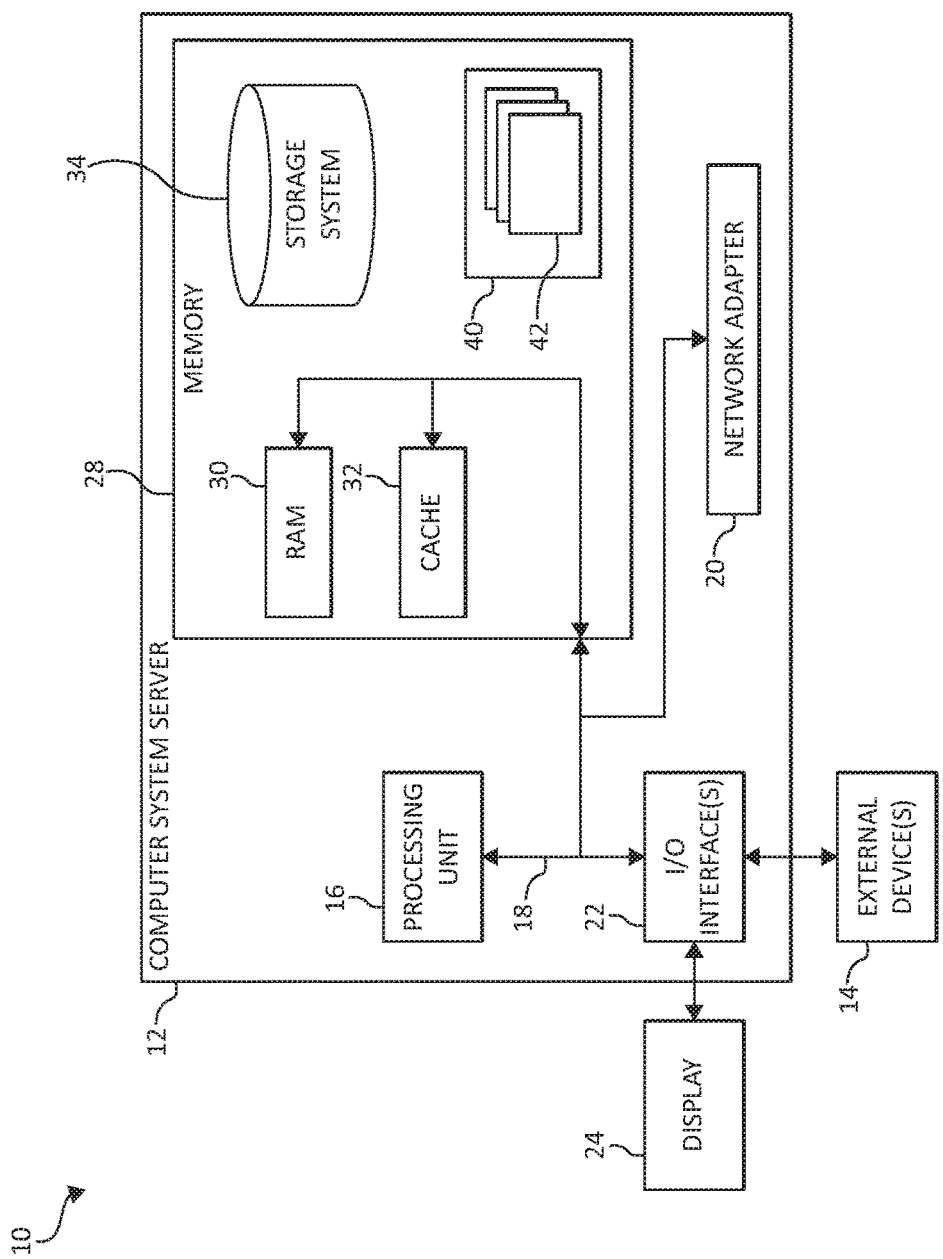
FIG. 1 is a block diagram depicting an exemplary cloud computing node according to an embodiment of the present invention.

The prolific increase in the use of electronic devices such as, for example, mobile phones (such as a smart phone), a laptop, a portable music player or an MP3 player, a tablet, a portable gaming unit, a camera (herein referred to individually and/or collectively as "User Equipment" or "UE") increases the chance of a UE becoming lost, misplaced, or stolen. For example, a user may become distracted and forget their UE in public locations, such as airports, taxis, trains, hotels, shopping malls, etc. Potential thieves capitalize on a user's misfortune and may steal personal electronic computing or communications devices. Many times these personal electronic computing or communications devices contain private or proprietary information stored therein, for which, it becomes self-evident to protect the private or proprietary information from potential thieves or hackers.

In one aspect, combating theft, data leaks, or hacking of the personal electronic computing or communications devices may include device encryption and data backup to reduce the risk of data leaks and to facilitate the purchase and setup of replacement devices. Some manufacturers of electronic computing or communications devices have a vested interest in this "theft ecosystem" as it actually drives additional sales. To this end, some laws have been enacted to require communication service providers to block reported stolen devices from accessing their respective communication networks. However, these attempts fall short in completely addressing the issue as most of these stolen devices can be still be operated in Wi-Fi only mode. Also, blocking a stolen UE from a communication network may be ineffective in many developing countries.

Accordingly, the present invention provides a solution to enable a user (e.g., an authorized user, owner of the UE, or administrator of the UE) of the UE to associate "authorized" power supply charging devices (e.g., a battery charger) with the UE, such that a stolen UE is unable to be charged to capacity equal to or greater than a specific threshold on non-authorized chargers (e.g., limp mode which may be an emergency operating mode), thus reducing the value and usefulness of the stolen or lost device.

In one embodiment, by way of example only, the present invention provides for using physical token based secured charge management of a user equipment (UE) by a processor. A power charging session is authorized by firmware of the UE for charging the UE upon detecting one or more physical authentication tokens within a selected area of a power charging source, on the power charging source itself, or a combination thereof.

A unique identifier may be affixed (temporarily and/or permanently) to one or more power charging supplies. The unique identifier may be a near field communication (NFC) identity, such as a NFC sticker. These NFC "stickers" may be secured to the selected area of a power charging source, on the power charging source itself, or combination thereof. Alternatively, the unique identifiers may include one or more quick response (QR) codes, a Bluetooth serial number token, a "1-wire" communication device (e.g., a Dallas (maxim) semi "1-wire" serial number token), a bar code, or combination thereof. The unique identification stickers can be applied by the end user to a charger associated with the UE, and/or may be placed substantially next the power supply charger or within a selected and defined region where the power supply charger ("charger") may be located, such as in a car, home, or office next to an outlet where the charger is plugged in. For example, the unique identification stickers can be placed within one or two feet of an outlet or on the outlet itself where the power supply charger may be located.

In one aspect, a monitoring application and firmware based monitoring applications on the UE may be used to artificially limit the UE to charging no more than a specific power charging threshold (e.g., no more than 10% charging) without being introduced to an authorized charger. The artificial limit may be an emergency operation mode or "limp mode" allowing the UE to be charged to the defined, power charging threshold for limited purposes, such as for dialing emergency responders. For example, a predetermined power charging threshold may be set as a numerical value. The firmware of the UE would limit the charging capability to the defined power charging threshold unless "unlocked" by a monitoring application component associated with the firmware. That is, in limp mode, when a charge level is reached the device will stop drawing power from the charger preventing a thief from just leaving the device plugged into a charger all the time.

Furthermore, a user may be required to perform a multi factor authentication operation to introduce the identification token to the monitoring application as "authorized" and then apply the identification token to the charger of the UE. To initiate an authorized charging session, the end user introduces the UE to the identification token, which then permits full charging for this charge session. Once the UE completes charging or is unplugged for more than a specified amount of time (e.g. 5 minutes), a re-authorization operation may be required to start charging again.

As an added form of UE protection from thieves or unauthorized or unintended users, the unique identification tokens may be required for presentation or detection by the UE for "re-authorization" at periodic intervals (e.g., every 3 months), such as, for example, in circumstances where an authorized identification token and/or authorized power supply charger has been stolen along with the UE.

Various embodiments further provide for associating UE with one or more authorized charging locations. In this way, a stolen UE is prevented from receiving a complete power charge. The UE may be restricted to a limited, unauthorized power charge (e.g., a limp mode) and thus cannot be charged more than a specific threshold at unauthorized locations thereby reducing the value and usefulness of the stolen or lost device. One or more geolocation locations or coordinates may be used to accurately obtain the current location of the UE to determine whether the UE is located within either an authorized charging location or an unauthorized charging location. For example, one or more Wi-Fi access point locations, internet protocol (IP) address geolocations, as well as satellite-based technologies such as global positioning satellite (GPS), Galileo navigation satellite system, Beidou navigation satellite system, and global orbiting navigation satellite system (GLONASS), or a combination thereof.

In one aspect, a geofencing operation may be performed that involves determining a specific amount of distance from a determined point that may be considered to be "safe" and within that location. Geofences can be relatively small when confined to a specific location, such as a house or an apartment, as Wi-Fi networks are able to also factor into the location information. In case of larger buildings or areas, a larger geofence may be required to ensure correct readings of the location. Thus, the present invention may use geofencing operations to dynamically size the geographical boundaries based on the accuracy of location information.

A power charging session may be authorized by firmware of the UE for charging the UE upon detecting the UE is within an authorized geographic location. The UE may artificially limit the UE to charge a battery of the UE up to no more than a specific threshold (example 10%) without the UE being within one of the pre-specified geofence locations. The firmware component of the UE may limit the charging capability unless "unlocked" by a management application. The authorized, end user may be required to perform a multi factor authentication to identify geolocations in which the user desires to authorize charging. For example, one user may specify the entire boundaries of cities "Tucson, Ariz." and "Tel Aviv, Israel" as pre-specified geofence locations, while other users may specific the user's home, work, and/or university as permitted.

Turning now to an additional embodiment, as described herein, a power supply charging session may be authorized by an application and firmware of the UE for charging the UE by using a cryptographic handshake between the UE and a power supply charging station. The UE may artificially limit the UE to charge a battery of the UE up to no more than a specific threshold (example 10%) without the UE being attached to an approved/authorized power supply charger. The firmware component of the UE may limit the charging capability unless "unlocked" by a management application. In this way, the present invention provides increased security in that the end user (e.g., owner of the UE) of the UE specifically authorizes a power supply charger as authorized/permitted and refuses a complete power supply charge session to charge the UE from unapproved chargers (e.g., third party chargers). The process of authorizing a power supply charger may include a multi factor authentication operation, such as providing biometric data and a dedicated password, a challenge and response type operation, or a combination thereof. For added protection, optional chargers may require "re-authorization" at periodic intervals, in cases where an authorized charger was also stolen along with the smart device.

As an added form of UE protection from thieves or unauthorized or unintended users, the authorized power supply chargers are required to perform a "re-authorization" at periodic intervals (e.g., every 3 months), such as, for example, in circumstances where an authorized power supply charger has been stolen along with the UE.

It should be noted that as described herein, each of the various power supply charger authentication operations may be performed in conjunction with other charging authorization concepts as described herein.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
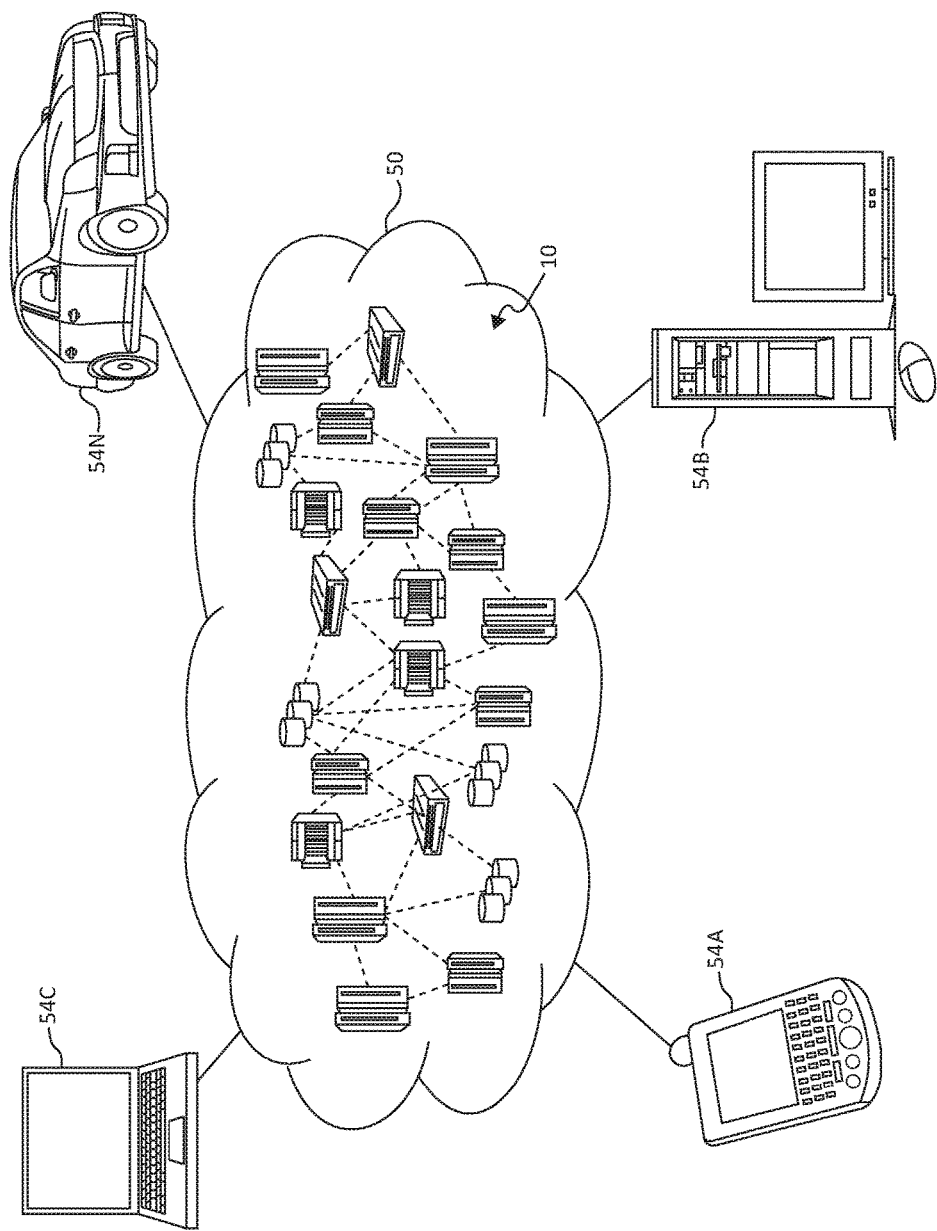
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
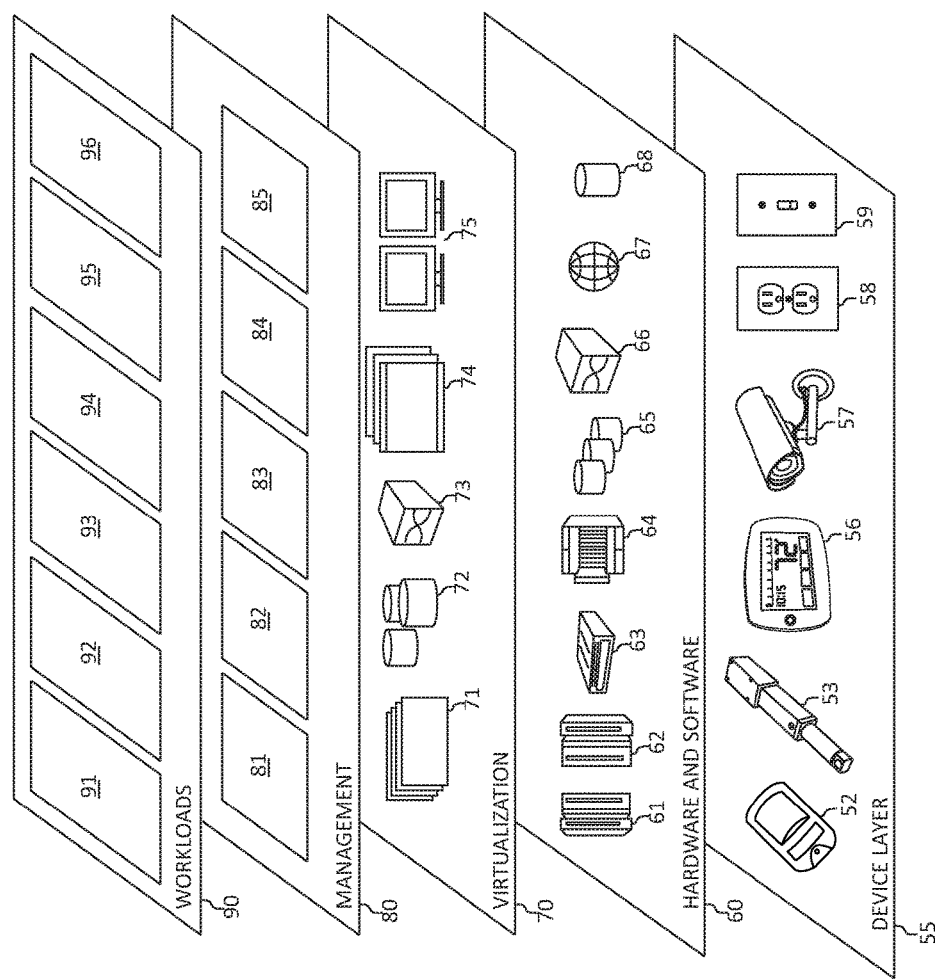
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various power supply charger management workloads and functions 96. In addition, power supply charger management workloads and functions 96 may include such operations as data analytics, data analysis, and as will be further described, notification functionality. One of ordinary skill in the art will appreciate that the power supply charger management workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
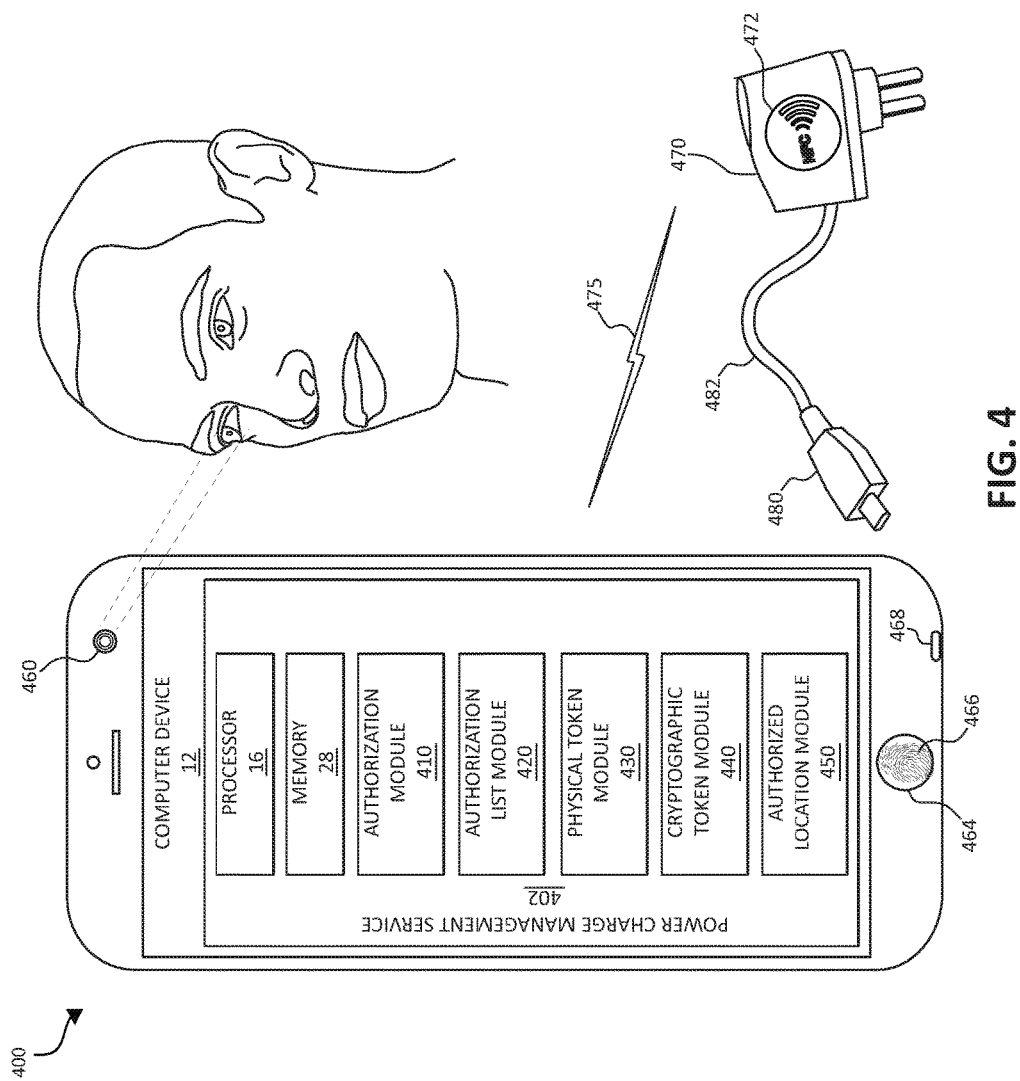
FIG. 4 is an additional block diagram depicting an exemplary functional relationship between various aspects of the present invention.

Turning now to FIG. 4, a block diagram 400 depicting exemplary functional components 400 according to various mechanisms of the illustrated embodiments, is shown. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for holographic image notification in accordance with the present invention. Many of the functional blocks 400 may execute as background processes on various components, either in distributed computing components, or on the user device, or elsewhere. Computer system/server 12 ("computer device" which may be a UE such as a smart phone) of FIG. 1 is again shown, incorporating processing unit 16 and memory 28 to perform various computational, data processing and other functionality in accordance with various aspects of the present invention. The computer device 12 may include a power (supply) charge management service 402 installed thereon. The power charge management service 402 may include an authorization module 410, authorization list module 420, a physical token module 430, a cryptographic token module 440, and/or an authorized location module 450, each of which may be in communication with and/or controlled by processor 16 with access to memory 28.

By way of example only, the computer device 12 may also include a power supply input 468 for receiving and/or connecting to one or more power supplies, such as a battery, a battery charger, and/or a power supply connection device for connecting to an external battery or power supply source. In one aspect, the computing device 12 may connect with one or more power supply charging sources, such as power charging source 470. The connection may be via a wireless communication link 475 and/or charger device 480 (e.g., a power cable, wire or connection cable) and connection device 482 (which connects to power supply input 468).

The computer device 12 may also include a camera device 460 (or camera module for controlling the camera 460) and a biometric detection device 464, for detecting one or more various types of biometric data, such as a fingerprint 466. In one aspect, the computer system/server 12 may be a server, computer, smart phone, laptop, tablet, portable television, smart phone, and/or any other computing device having a display such as a graphical user interface (GUI) on a two-dimensional touch screen, and a power charging supply source (e.g., a battery or battery charger).

As one of ordinary skill in the art will appreciate, the depiction of the various functional units in computer system/server 12 (e.g., a mobile device) is for purposes of illustration, as the functional units may be located within computer system/server 12 or elsewhere within and/or between distributed computing components.

In one aspect, the authorization module 410 may authorize a power charging session by firmware of the computer device 12 for charging the computer device 12 upon detecting, by the physical token module 430, one or more physical authentication tokens 472, such as a NFC sticker, within a selected area of a power charging source 470 or on the power charging source 470 itself, or a combination thereof. The one or more physical authentication tokens may be a near field communication (NFC) sticker, a quick response (QR) code, barcode, or combination thereof.

The authorization list module 420 may add the one or more physical authentication tokens to an approved list of authorized physical authentication tokens at the computer device 12. A unique password or biometric data, such as a retinal scan of a user's retina performed by the camera 460 or fingerprint 466 captured via the biometric device 464, may be received and/or entered into an application of the UE for adding the one or more physical authentication tokens to the approved list of authorized physical authentication tokens. A database (not depicted for illustrative convenience), associated with the computer device 12, may be synchronized with the one or more physical authentication tokens 472 and added to the approved list of authorized physical authentication tokens via the authorization list module 420. The approved list of authorized physical authentication tokens may be encrypted.

In one aspect, the one or more physical authentication tokens may be wirelessly detected by the authorization module 410 or communicated to the computer device 12 (e.g., authorization module 410) via a wireless communication link 475 to commence authorizing the power charging session. A re-authorization of a subsequent power charging session may be required by firmware of the computer device 12 to charge the computer device 12 upon detecting a termination or disconnection of the power charging session by the authorization module 410. The authorization module 410 may allow an unauthorized charging session, prior to the authorizing, to charge the computer device 12 up to a pre-authorized charging limit, such as up to a 10% charged capacity.

In one aspect, the authorization module 410 may authorize a power charging session by firmware of the computer device 12 for charging the computer device 12 using a cryptographic handshake between the computer device 12 and a power charging source 470.

Furthermore, the authorization module 410, in conjunction with the cryptographic token module 440, may authorize a power charging session by firmware of the computer device 12 for charging the computer device 12 using a cryptographic handshake between the computer device 12 and the power charging source 470. In one aspect, the authorization module 410 performs the cryptographic handshake with the power charging source 470 by connecting to the charger device 480 (e.g., a power cable, wire or connection cable) and the connection device 482 of the power charging source 470. Alternatively, the authorization module 410 performs the cryptographic handshake with the power charging source 470 using a wireless communication link 475, such as, for example, a personal area network (PAN) wireless communication link.

The computer device 12, using the cryptographic token module 440, may query the power charging source 470, which may be a power charging station, for a cryptographic identification token. The power charging source 470 may be added to the authorization list module 420, which may be an approved list of authorized power charging stations for the computer device 12. The authorization module 410 may require a user to enter a unique password (e.g., a password or identification that is not identical to a locking/unlocking password used to initially access or lock the computer device 12) for adding the power charging source 470 to the authorization list module 420. The authorization module 410 may validate the power charging source 470 according to the authorization list module 420 (e.g., approved list of authorized power charging stations) stored in a database (not depicted for illustrative convenience) associated with the computer device 12. The authorization module 410 may also require a re-authorization of a subsequent power charging session by firmware of the computer device 12 for charging the computer device 12 upon detecting a termination or disconnection of the authorized power charging session. The computer device 12 may enter a limp mode whereby the authorization module 410 may allow an unauthorized charging session, prior to the authorizing, to charge the computer device 12 up to a pre-authorized charging limit.

In an alternative aspect, the authorization module 410 may also authorize a power charging session by firmware of the computer device 12 for charging the computer device 12 upon detecting, by the authorized location module 450, the computer device 12 is within an authorized geographic location, which may be defined by an authorized user or administrator of the computer device 12. The authorized geographic location may be defined by an authorized user or administrator of the computer device 12 and may be stored in an approved list of authorized geographic locations by the authorization list module 420. The approved list of authorized geographic locations may be stored in a database associated with the computer device 12 and may be accordingly synchronized upon the authorized geographic locations being defined.

It should be noted that computer device 12 may be a wireless device, such as a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including a third generation partnership project (3GPP) long term evolution (LTE), Wi-Fi/Worldwide Interoperability for Microwave Access (Wi-MAX) networks, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 5:
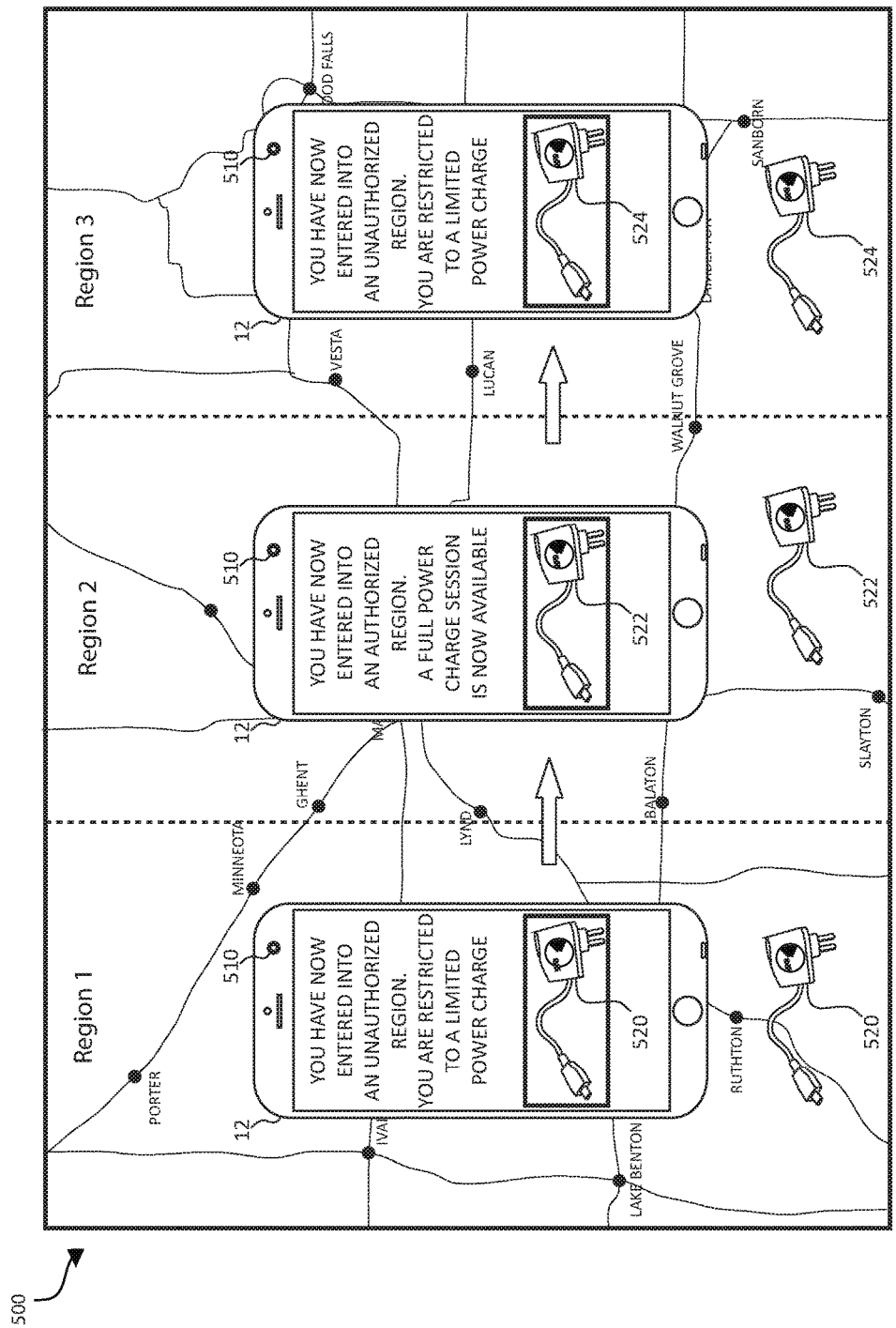
FIG. 5 is an additional block diagram depicting an exemplary functional relationship between various aspects of the present invention.

In view of the method 400 of FIG. 4, consider, as an illustration of exemplary functional blocks to accomplish the authorized location for location defined power charging management, as depicted in FIG. 5. Each of the functional blocks 500 may be implemented in hardware and/or software, such as by the computer/server 12 (FIGS. 1 and 4), and/or the workloads layer 90 (FIG. 3). For example, camera 510 and power supply input 520 may be similar to and/or identical to camera 460 and power supply input 468 of FIG. 4. In other words, each of the modules, devices, services, and/or functions described in FIGS. 1-3 may be implemented and used in FIG. 5.

In view of the foregoing blocks of functionality 500, the following specific examples of functionality may be implemented. By way of example only, FIG. 5 depicts one or more regions, which may be of various shapes, sizes, and/or dimensions, such as region 1, region 2, and region 3. For example, the regions may be a home, building, group of buildings, sections of a city, an entire city, geographical region, country, and/or a combination thereof. An authorized user of the computer device 12 may define one or more regions, such as region 2, as an authorized geographic location. If a region, such as regions 1 and 3, are not specifically authorized and/or defined, by default, the regions may be categorized and labeled as unauthorized. An image may be displayed in the computer device 12 representing a power supply charger, such as power supply chargers 520, 522, or 524. It should be noted that power supply chargers 520, 522, or 524 may be the same power supply charger or different power supply chargers.

Consider now the following example of the computer device 12 moving from one region to another, such as moving from region 1 to region 2 and then to region 3. For illustrative purposes, it may be assumed that an authorized user of the computer device 12 defined and indicated that region 2 is an authorized location for permitting a full power charge operation to charge the computer device 12. Starting in region 1 (defined as unauthorized which may be a default setting), the computer device 12 may restrict the authorization of the power charging session for charging the computer device 12 upon detecting the computer device 12 is outside the authorized geographic location.

A notification is displayed indicating the computer device 12 is in the unauthorized region. For example, the computer device 12 may receive a notice (communication message) from a wireless communication network and/or may internally generate the notification, such as, for example "You have now entered into an unauthorized region. You are restricted to a limited power charge". An image of one or more unauthorized power supply chargers, such as power supply charger 520, may be displayed in the computer device 12.

Thus, the computer device 12 may be restricted from a power supply session which charges and supplies power to the computer device 12. That is the power supply source 520, which may be a battery charger owned by the authorized user or other compatible power supply source with the computer device 12, is restricted from supplying a power charge to the computer device.

Assume now the computer device 12 relocates from region 1 to region 2. Upon entering region 2, region 2 is verified and validated as an authorized geographic location from an approved list of authorized geographic locations for authorizing the power charging session. A power supply charger 522, which may be a battery charger owned by the authorized user or other compatible power supply source with the computer device 12, is permitted and granted authority for supplying a power charge to the computer device 12. A notification is displayed indicating the computer device 12 is in the authorized region. For example, the computer device 12 may receive a notice (communication message) from a wireless communication network and/or may internally generate the notification, such as, for example "You have now entered into an authorized region. A full power charge session is now available". An image of the authorized power supply charger, such as power supply charger 522, may be displayed in the computer device 12.

If at any point in time while the computer device 12 is located within the authorized region, such as region 2, and the initial, authorized power charging session for charging the computer device 12 is terminated or disconnected, the computer device 12 may require a re-authorization of a subsequent power charging session by firmware of the computer device 12 for charging the computer device 12. It should also be noted that the authorized region, such as region 2, may also be limited in time. For example, a region, such as region 2, may be designated as an authorized location during a selected time period window, such as for example Monday through Friday from 8:00 a.m. until 5:00 p.m. During time periods outside the selected time period window, the region, such as region 2, may be determined to be unauthorized upon expiration of the selected time period window.

Continuing with the example, assume now computer device 12 now travels out of the authorized region, such as region 2, into another unauthorized region, such as region 3. It should be noted, however, if during an active, authorized power session where the computer device 12 is being charged by a power source, such as power supply charger 522, the computer device 12 moves from an authorized region to an unauthorized region, the active, authorized power session may continue. However, a notification may be issued to alert the user of the computer device of the restricted area.

However, if the active, authorized power session has terminated prior to the computer device 12 traveling out of the authorized region, such as region 2, into another unauthorized region, such as region 3, any subsequent attempts to charge the computer device 12 may be restricted. A notification may be displayed indicating the computer device 12 is in the unauthorized region. For example, the computer device 12 may receive a notice "You have now entered into an unauthorized region. You are restricted to a limited power charge". Thus, the computer device 12 may be restricted from a power supply session with a power supply source, such as power supply charger 524, which charges and supplies power to the computer device 12.

It should be noted that computer device 12 may enter into a limp mode operation while in the unauthorized regions, such as regions 1 and 3. In the limp mode, the computer device 12 may permit an unauthorized charging session to charge the computer device 12 only up to a pre-authorized charging limit (e.g., 10% battery power limit of the smart phone) upon the computer device 12 being located in an unauthorized geographic location, such as regions 1 and 3.

With the foregoing functional components in view, consider some of the various aspects of the illustrated embodiments in operation.

Physical Authentication Tokens

In one aspect, the physical authentication tokens, such as a NFC sticker, QR Code, barcode, or other identifying sticker may be placed on and/or near the authorized power supply charger or location. For physical portable chargers, including stand-alone battery devices, the physical authentication token/sticker may be placed on the power supply charger device itself. For a power supply charger that may be physically too small or awkward to affix the physical authentication token/sticker, the physical authentication token/sticker may be placed at or near the power supply charger. For example, it may not be possible to affix the physical authentication token/sticker to a vehicle charger in a vehicle, but it may be possible to affix the physical authentication token/sticker near the vehicle charger.

Once the physical authentication token/sticker is affixed to the power supply charger, the identifying physical authentication token/sticker must be introduced to the application on the smart device to add the physical authentication token/sticker to a list of authorized identification physical authentication tokens/stickers. This authorization process may leverage additional authentication operations, such as, for example, a two-factor authorization. For example, a text message may be sent to a user's smart phone while a power supply charger is being authorized on an alternative device, such as a tablet of the user. Biometric authentication of biometric data, such as a fingerprint or retinal scan, may be required. Additionally, it should be enforced that a password or code that is not identical to the unlock password/code to unlock/lock the UE is required to introduce authorized identification physical authentication tokens/stickers to the application of the UE.

A local database of authorized identification physical authentication tokens/stickers and chargers may be synchronized as part of a normal backup of the UE. The authorized identification physical authentication tokens/stickers may be stored in a list and encrypted using one or more encryption operations. In one aspect, one or more hashing or salting operations may be used to protect the integrity of the list/data in the database.

Authorized Charging Process

When starting a charging process, such as plugging a UE into a power supply charger, and preparing to plug a power supply charger in (which may be an asynchronous process), the UE can dynamically open an application interface. The user may scan the physical authentication token/sticker into the application of the UE. The application validates the physical authentication token/sticker based upon the stored database of authorized physical authentication tokens/stickers. The application may instruct the firmware charger controls that power supply charging is authorized and a complete (full or maximum) power supply charging session may begin within a period of time (such as one minute) in order to give the user time to plug in the charger into the UE if they have not already plugged it in. If the charger is disconnected for a configurable period of time (e.g., 5 minutes) the firmware may terminate/end the authorized power charging session and require a re-authorization operation.

Optionally, once the authorized, power supply charging operation completes, the authorized, power supply charging operation session may "end" and require a re-authorization to begin charging at a subsequent point in time.

Unauthorized Charging

Multiple situations may exist where an authorized charger may be unavailable or a power charging management application of the UE may be unable to authorize a charging session. For example, the UE battery may be drained to a zero charge, one or more authorized charger/identification stickers are unavailable or non-existent at a current location, and/or internet access may be unavailable in order to introduce a new identification sticker to the system.

To address these challenges, an optional firmware level mode may be performed. That is, the operation mode at the firmware level may be a "limp mode" or "limp charge mode" that may be implemented to permit charging to a pre-specified charge level (e.g., 10%). As a further embodiment, the "limp mode charge (e.g., a battery of the UE charged to a defined percentage) may be configured to decay, for example, starting at 15% for a first time it is used, and progressively shrinking to a maximum charge, such as, for example, 5% after three unauthorized charges. This value may automatically reset to a higher value after a successful authorized charge.

Once the UE reaches the pre-authorized charge level (e.g., maximum limp mode charge), the temporary, unauthorized charging may be discontinued. This eliminates the possibility of using the UE while the UE is plugged in. Also, the limp mode charge level may be insufficient for normal use, and thus not attractive for a thief, but would be sufficient for the owner to be able to obtain an authorized charge session and/or contact emergency personal, if required. If the UE activates the limp mode, the time, date, and available location, if available, of the unauthorized charging may be stored by the firmware level charge limiter for the power charging management application to later provide to the end user via either a cloud computing gateway, email, short message service ("SMS"), or other communication method. The data may persist past a factory restore of the UE. Again, in limp mode, when a charge level is reached the device will stop drawing power from the charger preventing a thief from just leaving the device plugged into a charger all the time. In short, the limp mode prevents a UE from operating or running once a predetermined charge level is reached.

Cryptographic Handshake

In one aspect, a charging device (e.g., a power supply charging station) may be equipped with a cryptographic identification token. Using either a "wired" charging connection or via PAN wireless communication, the cryptographic identification token can be queried by the UE. When a new charging device is being setup for use with the UE, the new charging device must be introduced to a power supply charging management application on the UE to add the new charging device to the list of authorized charging devices.

This authorization process may leverage additional authentication operations, such as, for example, a two-factor authorization. For example, a text message may be sent to a user's smart phone while a power supply charger is being authorized on an alternative device, such as a tablet of the user. Biometric authentication of biometric data, such as a fingerprint or retinal scan, may be required. Additionally, it should be enforced that a password or code that is not identical to the unlock password/code to unlock/lock the UE is required to introduce authorized charging devices of the application.

The local database of an authorized charging device may be synchronized as part of a routine backup operation of the UE. The authorized charging devices may be stored using one or more encryption operations to avoid the possibility of the local database of authorized charging devices from being tampered with or hijacked. Standard storage techniques such as, for example, hashing and salting may be used in securing the integrity of the database.

As described above, the authorized charging and unauthorized charging for the cryptographic handshake may be similar in scope and in operations for the physical authentication token/sticker. That is, the embodiments and operations for the authorized charging process and unauthorized charging as described above regarding physical authentication tokens, may be similar in scope and function for the cryptographic handshake.

Authentication Locations

In one aspect, the UE may support one or more geolocations. The UE may be equipped with some form of satellite based geolocation devices, such as GPS, Galileo, Beidou, and/or GLONASS. In addition to the satellite based geolocations, the UE may support mobile network location triangulation, and even, Wi-Fi based geolocation capabilities and enhancements.

Within a secure part of the application, the authorized user can define permitted charging locations. Access to this "secure" part of the application may be controlled separately from access to the UE. This authorization process may leverage additional authentication operations, such as, for example, a two-factor authorization. For example, a text message may be sent to a user's smart phone while a power supply charger is being authorized on an alternative device, such as a tablet of the user. Biometric authentication of biometric data, such as a fingerprint or retinal scan, may be required. Additionally, it should be enforced that a password or code that is not identical to the unlock password/code to unlock/lock the UE is required to create a new geolocation or geofence.

The local database of authorized charging geolocations may be synchronized as part of a routine backup operation of the UE. The authorized charging geolocations may be stored using one or more encryption methods to avoid the possibility of the local database of authorized charging geolocations from being tampered with or hijacked. Standard storage techniques such as hashing and salting are also quite useful in securing the integrity of the database. The scope and number of these security layers is user configurable. For example, the larger the geofence, the more likely the UE is able to be charged by a potential thief.

In one aspect, the larger geofences may be useful for mobile charging. The user may also be required to define one or more locations particularly for smaller geofences. The geofences may give the user more control over authorized charging locations for the geofences. Optionally this method of restricting where charging is permitted can be augmented with additional methods of providing secure/authorized charging.

Authorized Charging Process

When starting a charging process, such as plugging a UE into a power supply charger and preparing to plug a power supply charger in (which may be an asynchronous process), the UE can dynamically open an application interface. The application validates the defined location based upon the stored database of authorized location (e.g., geofence locations). The application may instruct the firmware charger controls that the power supply charging is authorized and a complete (full or maximum) power supply charging session may begin within a period of time (such as one minute) in order to give the user time to plug in the charger into the UE if they have not already plugged it in. If the charger is disconnected for a configurable period of time (e.g., 5 minutes) the firmware may terminate/end the authorized power charging session and require a re-authorization operation.

Optionally the application of the UE may periodically check a UE geolocation and a Geo Fence database to ensure that the UE has not been moved outside of a permitted charging location, such as while connected to an external battery. Optionally, once the authorized, power supply charging operation completes, the authorized, power supply charging operation session may "end" and require a re-authorization to begin charging at a subsequent point in time.

Unauthorized Charging

Multiple situations may exist where power supply charging is required in a geolocation that has not been authorized. For example, the UE battery may be drained to a zero charge, one or more geolocations may not have been added to permitted, charging geofence locations. Data/internet access may be unavailable in order to define a new Geo Fence location.

To address these challenges, an optional firmware level mode may be performed. That is the operation mode at the firmware level may be a "limp mode" or "limp charge mode" that may be implemented to permit charging to a pre-specified charge level (example 10%). As a further embodiment, optionally the "limp mode" charge (e.g., a battery of the UE charged to a defined percentage) can be configured to decay, for example starting at 15% for a first time it is used, and progressively shrinking to a maximum charge of 5% (example only) after three unauthorized charges. This value may automatically reset to a default, higher value after a successful authorized charge.

Once the UE reaches the pre-authorized charge level (e.g., maximum limp mode charge), the temporary, unauthorized charging may be discontinued. This eliminates the possibility of using the UE while the UE is plugged in, and leaving the battery at the "limp" level. Also, the limp mode charge level may be insufficient for normal use, and thus not attractive for a thief, but would be sufficient for the owner to be able to obtain an authorized charge session and/or contact emergency personal, if required. If the UE activates the limp mode, the time, date, and available location, if available, of the unauthorized charging may be stored by the firmware level charge limiter for the power charging management application to later provide to the end user via either a cloud computing gateway, email, short message service ("SMS"), or other communication method. The data may persist past a factor restore of the UE.

Figure 6:
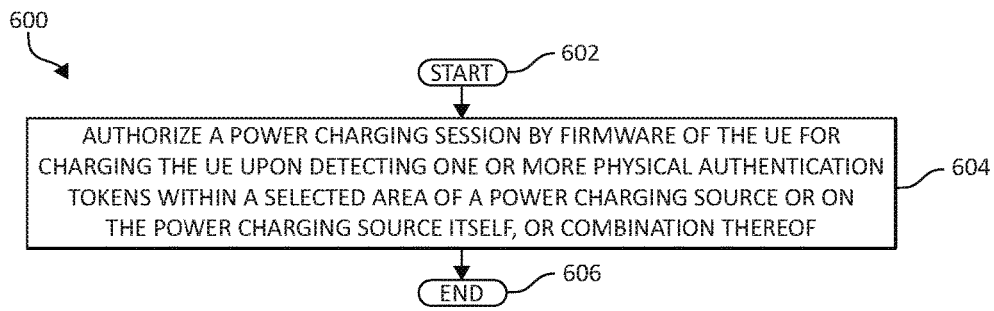
FIG. 6 is an additional flowchart diagram depicting an additional exemplary method for physical token based secured charge management of a user equipment (UE) in which various aspects of the present invention may be realized.

Turning now to FIG. 6, a method 600 for using physical token based secured charge management of a UE by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. A power charging session is authorized by firmware of the UE for charging the UE upon detecting one or more physical authentication tokens within a selected area of a power charging source or on the power charging source itself, or combination thereof, as in block 604. The functionality 600 may end, as in block 606. As one of ordinary skill in the art will appreciate, the various steps depicted in method 600 may be completed in an order or version differing from the depicted embodiment to suit a particular scenario.

In one aspect, in conjunction with and/or as part of at least one block of FIG. 6, the operations of 600 may include each of the following. The operations of 600 may add the one or more physical authentication tokens to an approved list of authorized physical authentication tokens at the UE, wherein the one or more physical authentication tokens are a near field communication (NFC) sticker, a quick response (QR) code, barcode, or combination thereof. A unique password may be entered into an application of the UE for adding the one or more physical authentication tokens to the approved list of authorized physical authentication tokens. A database associated with the UE may be synchronized with the one or more physical authentication tokens added to the approved list of authorized physical authentication tokens. The approved list of authorized physical authentication tokens is encrypted.

The operations of 600 may scan the one or more physical authentication tokens by the UE to commence authorizing the power charging session. A re-authorization of a subsequent power charging session may be required by firmware of the UE for charging the UE upon detecting a termination or disconnection of the power charging session. The operations of 600 may also allow an unauthorized charging session, prior to the authorizing, to charge for charging the UE up to a pre-authorized charging limit.

Figure 7:
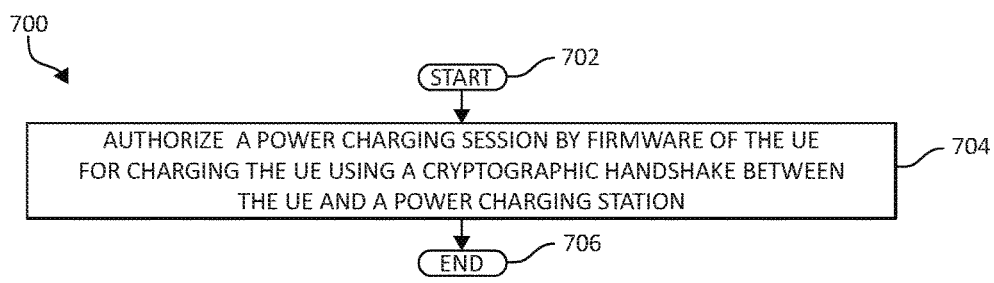
FIG. 7 is an additional flowchart diagram depicting an additional exemplary method for using power charge management authorization for a user equipment (UE) with secured power charging stations, again in which various aspects of the present invention may be realized.

Turning now to FIG. 7, a method 700 for using power charge management authorization for a UE with secured power charging stations by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. A power charging session is authorized by firmware of the UE for charging the UE using a cryptographic handshake between the UE and a power charging station, as in block 704. The functionality 700 may end, as in block 706. As one of ordinary skill in the art will appreciate, the various steps depicted in method 700 may be completed in an order or version differing from the depicted embodiment to suit a particular scenario.

In one aspect, in conjunction with and/or as part of at least one block of FIG. 7, the operations of 700 may include each of the following. The operations of 700 may query, by the UE, the power charging station for a cryptographic identification token. The operations of 700 may add the power charging station to an approved list of authorized power charging stations for the UE and may validate the power charging station according to the approved list of authorized power charging stations stored in a database associated with the UE. A unique password may be entered into an application of the UE for adding the power charging station to an approved list of authorized power charging stations.

The operations of 700 may synchronize a database with the power charging station added to the approved list of authorized power charging stations, wherein the approved list of authorized power charging stations is encrypted. A re-authorization of a subsequent power charging session may be required by firmware of the UE for charging the UE upon detecting a termination or disconnection of the power charging session. An unauthorized charging session may be allowed, prior to the authorizing, to charge for charging the UE up to a pre-authorized charging limit.

Figure 8:
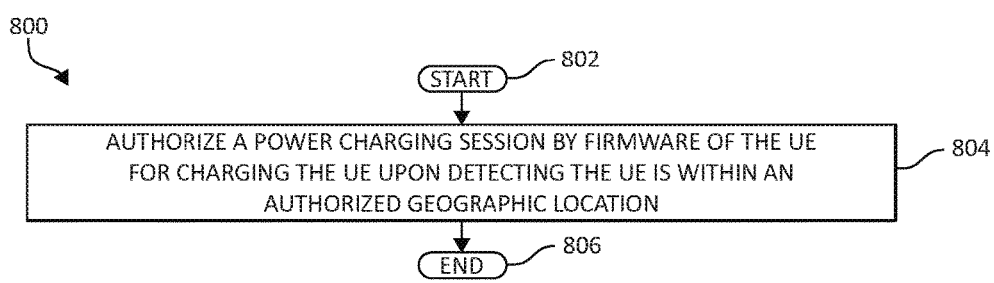
FIG. 8 is an additional flowchart diagram depicting an additional exemplary method for using location defined power charge management authorization for a user equipment (UE), again in which various aspects of the present invention may be realized.

Turning now to FIG. 8, a method 800 for using power charge management authorization for a UE with secured power charging stations by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. A power charging session is authorized by firmware of the UE for charging the UE upon detecting the UE is within an authorized geographic location, as in block 804. The functionality 800 may end, as in block 806. As one of ordinary skill in the art will appreciate, the various steps depicted in method 800 may be completed in an order or version differing from the depicted embodiment to suit a particular scenario.

In one aspect, in conjunction with and/or as part of at least one block of FIG. 8, the operations of 800 may include each of the following. The operations of 800 may define the authorized geographic location by an authorized user of the UE. The authorization of the power charging session may be restricted for charging the UE upon detecting the UE is outside the authorized geographic location. A defined geographic location may be authorized and identified as one of a plurality of authorized geographic locations by the UE. The authorized geographic location may be stored in an approved list of authorized geographic locations stored in a database associated with the UE.

The operations of 800 may validate the authorized geographic location as one of a plurality of authorized geographic locations listed on an approved list of authorized geographic locations for authorizing the power charging session. A re-authorization of a subsequent power charging session may be required by firmware of the UE for charging the UE upon detecting a termination or disconnection of the power charging session. An unauthorized charging session may be permitted to charge the UE up to a pre-authorized charging limit upon the UE being located in an unauthorized geographic location. The power charging session may be permitted to continue to charge the UE upon detecting the UE relocated from the authorized geographic location to an unauthorized geographic location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for physical token based secured charge management of a user equipment (UE) by a processor, comprising:

authorizing a power charging session by firmware of the UE for charging the UE upon detecting one or more physical authentication tokens within a selected area of a power charging source or on the power charging source itself, or combination thereof, the power charging source comprising a power supply brick receiving power from an outlet; wherein the detecting further includes validating a current geographic location of the UE is on an approved list of authorized geographic locations stored in a database associated with the UE; and allowing an unauthorized charging session, prior to the authorizing, to charge the UE up to a pre-authorized charging limit comprising a predetermined percentage of charged capacity of the UE; wherein the unauthorized charging session is allowed prior to the authorizing upon detecting, by the firmware of the UE, that an unauthorized power charging source has been connected to the UE.

2. The method of claim 1, further including adding the one or more physical authentication tokens to an approved list of authorized physical authentication tokens at the UE, wherein the one or more physical authentication tokens are a near field communication (NFC) sticker, a quick response (QR) code, barcode, or combination thereof.

3. The method of claim 2, further including entering a unique password into an application of the UE for adding the one or more physical authentication tokens to the approved list of authorized physical authentication tokens.

4. The method of claim 3, further including synchronizing the database with the one or more physical authentication tokens added to the approved list of authorized physical authentication tokens, wherein the approved list of authorized physical authentication tokens is encrypted.

5. The method of claim 1, further including scanning the one or more physical authentication tokens by the UE to commence authorizing the power charging session.

6. The method of claim 1, further including requiring a re-authorization of a subsequent power charging session by firmware of the UE for charging the UE upon detecting a termination or disconnection of the power charging session.

7. A system for physical token based secured charge management of a user equipment (UE), comprising:

a hardware processor, operational within and between a distributed computing environment, that:

authorizes a power charging session by firmware of the UE for charging the UE upon detecting one or more physical authentication tokens within a selected area of a power charging source or on the power charging source itself, or combination thereof, the power charging source comprising a power supply brick receiving power from an outlet; wherein the detecting further includes validating a current geographic location of the UE is on an approved list of authorized geographic locations stored in a database associated with the UE; and allows an unauthorized charging session, prior to the authorizing, to charge the UE up to a pre-authorized charging limit comprising a predetermined percentage of charged capacity of the UE; wherein the unauthorized charging session is allowed prior to the authorizing upon detecting, by the firmware of the UE, that an unauthorized power charging source has been connected to the UE.

8. The system of claim 7, wherein the processor adds the one or more physical authentication tokens to an approved list of authorized physical authentication tokens at the UE, wherein the one or more physical authentication tokens are a near field communication (NFC) sticker, a quick response (QR) code, barcode, or combination thereof.

9. The system of claim 8, wherein the processor enters a unique password into an application of the UE for adding the one or more physical authentication tokens to the approved list of authorized physical authentication tokens.

10. The system of claim 9, wherein the processor synchronizes the database with the one or more physical authentication tokens added to the approved list of authorized physical authentication tokens, wherein the approved list of authorized physical authentication tokens is encrypted.

11. The system of claim 7, wherein the processor scans the one or more physical authentication tokens by the UE to commence authorizing the power charging session.

12. The system of claim 7, wherein the processor requires a re-authorization of a subsequent power charging session by firmware of the UE for charging the UE upon detecting a termination or disconnection of the power charging session.

13. A computer program product for physical token based secured charge management of a user equipment (UE) by a processor, the computer program product comprising a non-transitory computer-readable storage medium having computer-readable program code portions stored therein, the computer-readable program code portions comprising:
   an executable portion that authorizes a power charging session by firmware of the UE for charging the UE upon detecting one or more physical authentication tokens within a selected area of a power charging source or on the power charging source itself, or combination thereof, the power charging source comprising a power supply brick receiving power from an outlet; wherein the detecting further includes validating a current geographic location of the UE is on an approved list of authorized geographic locations stored in a database associated with the UE; and
   an executable portion that allows an unauthorized charging session, prior to the authorizing, to charge the UE up to a pre-authorized charging limit comprising a predetermined percentage of charged capacity of the UE; wherein the unauthorized charging session is allowed prior to the authorizing upon detecting, by the firmware of the UE, that an unauthorized power charging source has been connected to the UE.

14. The computer program product of claim 13, further including an executable portion that:
   adds the one or more physical authentication tokens to an approved list of authorized physical authentication tokens at the UE, wherein the one or more physical authentication tokens are a near field communication (NFC) sticker, a quick response (QR) code, barcode, or combination thereof; and
   enters a unique password into an application of the UE for adding the one or more physical authentication tokens to the approved list of authorized physical authentication tokens.

15. The computer program product of claim 14, further including an executable portion that synchronizes the database with the one or more physical authentication tokens added to the approved list of authorized physical authentication tokens, wherein the approved list of authorized physical authentication tokens is encrypted.

16. The computer program product of claim 13, further including an executable portion that scans the one or more physical authentication tokens by the UE to commence authorizing the power charging session.

17. The computer program product of claim 13, further including an executable portion that requires a re-authorization of a subsequent power charging session by firmware of the UE for charging the UE upon detecting a termination or disconnection of the power charging session.

* * * * *